Oct. 28, 1969

C. H. PETERS ET AL 3,474,961

SPEED CONTROL FOR BLOWER IN FORCED
AIR SYSTEM USED FOR HEATING

Filed Feb. 13, 1968

INVENTORS
CLAUDE H. PETERS
RICHARD C. PETERS
JACK A. PETERS

BY Stryker and Jacobson

ATTORNEYS

Oct. 28, 1969

C. H. PETERS ET AL
SPEED CONTROL FOR BLOWER IN FORCED
AIR SYSTEM USED FOR HEATING 3,474,961

Filed Feb. 13, 1968

INVENTORS
CLAUDE H. PETERS
RICHARD C. PETERS
JACK A. PETERS

BY Stryker and Jacobson

ATTORNEYS

United States Patent Office 3,474,961
Patented Oct. 28, 1969

3,474,961
SPEED CONTROL FOR BLOWER IN FORCED AIR SYSTEM USED FOR HEATING
Claude H. Peters, St. Paul, Minn., and Richard C. Peters and Jack A. Peters, White Bear Lake, Minn. 55110
Filed Feb. 13, 1968, Ser. No. 705,109
Int. Cl. G05d 23/08, 23/30
U.S. Cl. 236—10                    3 Claims

ABSTRACT OF THE DISCLOSURE

A temperature responsive member, such as a bimetal element, is mechanically coupled to a friction clutch which is located between the shaft of a constant speed drive motor and driven pulleys for driving a blower used to circulate air in a forced air heating and air conditioning system. A sample of the air within the system is applied to the bimetal element to control the speed at which the blower is driven during the heating mode of operation. When the same system is used for air-conditioning, such as cooling, filtering, or ventilating, an electrical element applies heat to the bimetal to control the blower speed in the same manner. In these latter modes, the heating element located in close proximity to the bimetal sample of air from the system is prevented from reaching the temperature responsive member. Manual or automatic control elements can be used to vary the energy to the heating element and correspondingly control the heat emanating therefrom.

CROSS REFERENCE TO RELATED APPLICATION

This invention is an improvement over the control mechanism described in Peters' Patent 2,838,243.

BACKGROUND OF THE INVENTION

Field of the invention

The invention is directed for use in systems which use forced air circulation for heating and other air-conditioning modes of operation, such as cooling, filtering, or ventilating where it is desirable to control the speed of the blower.

Description of the prior art

Early forced air heating systems, which are still in common use today, have a constant speed motor drive shaft continuously coupled to the blower and during the heat-mode of operation, a blower or fan control switch turns the blower motor on and off as needed to try to distribute the air being warmed by the furnace. In an attempt to obtain more efficient and uniform heating, there were developed controls by which the speed of the blower was varied according to the temperature of the air coming out of the furnace and being distributed through the system. Controls of this nature, such as described in Peters' patent supra, use a temperature responsive member, such as a bimetal element, which responds to a sample of the circulating warm air in order to control the degree of coupling between the driving motor and the blower to thereby vary the speed of the blower. With the recent popularity of air cooling and air conditioning using the same air circulation system used for heating, means had to be provided to make the blower operate during the latter modes of operation. This ordinarily was done by mechanically coupling the blower directly to the drive motor shaft which required some manual manipulations. This resulted in the blower being driven at a single speed whenever the drive motor was energized during the cooling or other air conditioning modes of operation. Not only was it somewhat irksome and time consuming for the ordinary householder to make whatever manual adjustments were necessary, but also the benefits of the variable speed drive during air conditioning modes (other than heating) were lost. Just as with the heating mode, it is often beneficial to be able to conveniently or automatically vary the blower speed during other air conditioning modes.

SUMMARY

To bring the temperature responsive or bimetal members into operation even when warm air is not available in the system, such as in the cooling, filtering, or ventilating modes, an electrically powered heat generating element is located in close proximity to said bimetal members. During the air conditioning modes of operation, electrical current supplied to the heating element causes the latter to produce enough heat to cause the bimetal elements to control the degree of engagement of the friction clutch between the drive motor and the blower pulley so that the blower is driven. The passageway by which a sample of warm air is applied to the bimetal elements from the circulating system during the heating mode of operation is closed off by another temperature responsive element located within the air circulating system. As a further feature, the electrical energy being fed to the heating element may be switched on or off and/or varied automatically or manually to cause the drive motor to drive the blower at varying speeds in the same as it is done during the heating mode of operation. A temperature sensitive element, such as a thermister or a manually adjustable resistance, may be placed in circuit with the energizing path for the heating element in order to control the flow of current to the latter and thereby eliminate the need for applying warm air from the system onto the temperature responsive elements even during the heating mode of operation.

DESCRIPTION OF THE PREFERRED EMBODIMENTS

Figure 1:
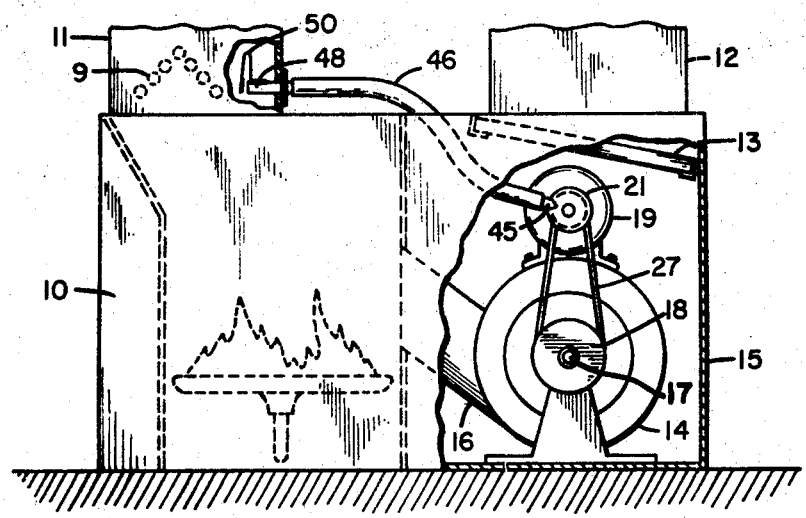
FIG. 1 is a somewhat diagrammatic elevational view showing in general the arrangement of the various components in an ordinary forced air system having a cooling coil installed and a typical installation of a preferred embodiment of the invention.

A commonplace houshold forced air heating system has a furnace 10 and a hot air outlet duct or plenum chamber 11 for carrying the heated air to the rooms of the house, usually through various branch ducts, not shown. The air is usually circulated by travelling through the rooms of the house and returning to the furnace through a return duct line 12, and filter 13 being forceably blown by blower 14 suitably mounted within a cabinet 15, through a blower discharge conduit 16 and then back through the furnace 10. The blower may be of any common variety having a shaft 17 upon which is fixed a pulley 18. A constant speed electric drive motor 19 is ordinarily conveniently mounted above the blower 14 and has a shaft 20 for driving temperature responsive variable speed control 21 which in turn is belt coupled to blower pulley 18. Without a variable speed control a fixed pulley would be secured to motor shaft 20 and be driven at full motor speed whenever motor 19 was energized. It is present day common practice to use this same general system for other air conditioning modes such as circulating air for cooling by blowing it across cooling coils 9 which are mounted in plenum 11 or circulating it for filtering or ventilating.

Figure 2:
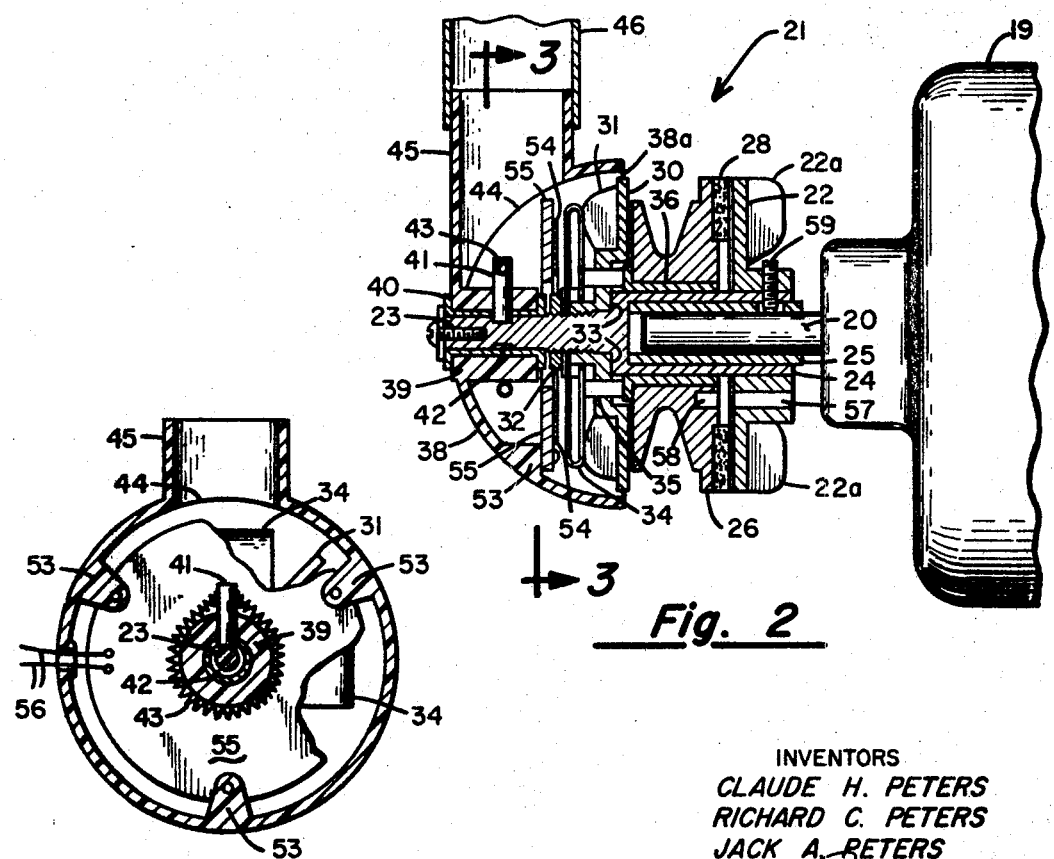
FIG. 2 is a vertical sectional view showing details of the construction of a temperature-responsive mechanism for varying the speed of the blower.

Referring now in particular to FIG. 2, there is shown the detailed construction of speed control 21 for smoothly varying the speed of the blower when driven by the constant speed motor 19. This mechanism includes a clutchplate 22 and an extension shaft 23 fixed on motor drive shaft 20. The extension shaft 23 is formed integrally with a sleeve portion 24 containing a bushing 25 fitting on shaft 20. The clutch plate 22 and shaft 23 and sleeve 24 may be attached to the shaft 20 of motor 19 by a set screw 59. Revolubly mounted on sleeve 24 is pulley 26 which is adapted to be operatively connected by belt 27 (FIG. 1) to blower pulley 18. The side face of pulley 26 nearest to clutchplate 22 had adhesively secured thereto an annular friction disc 28 adapted to frictionally engage the face of clutchplate 22 whereby the pulley 26 can be driven by the rotation of motor drive shaft 20. The speed at which pulley 26 is rotationally driven is determined by the degree of frictional engagement between friction disc 28 and clutchplate 22 which in turn depends upon the degree of pressure being applied against the side of the pulley.

The mechanism may include a fan 30 fixedly mounted on shaft 23 and having a plurality of radially extending blades 31. A portion of the shaft 23 is threaded and is fitted with a lock nut 32 adapted to clamp a hub portion of the fan against a shoulder 33 formed on shaft 23. As will become more apparent, the function of fan 30 is to help draw in a sample of air from the circulating system to be applied to certain temperature responsive devices for causing the clutch disc to be engaged.

Figure 3:
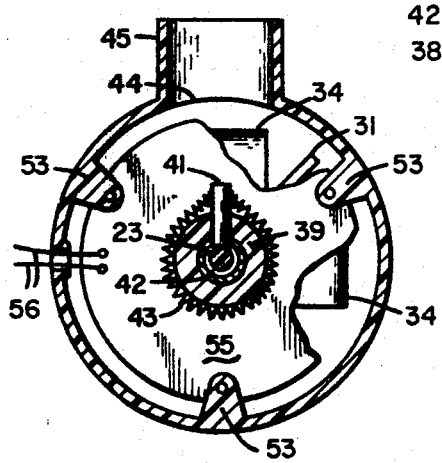
FIG. 3 is a cross-section as viewed approximately on line 3—3 of FIG. 2 illustrating some of the details of a preferred embodiment of the invention.

A pair of temperature responsive members in the form of bimetal elements 34 are fixedly attached to shaft extension 23 and are arranged so that their free ends can actuate pins 35 which extend through openings in the hub portion of the fan 30 to push pulley 26 toward the clutch disc 22. The bimetal elements 34 have a hole at their approximate center through which shaft extension 23 passes and are clamped by lock nut 32 against the hub portion of the fan 30 so that the bimetal elements 34 rotate with the rotation of shaft extension 23. As most clearly shown in FIGS. 2 and 3, bimetal elements 34 are metal strips having their ends bent back in a U shape and are arranged at 90° to one another with their free ends located opposite the four pins 35 which are equally spaced around the center of the shaft extension 23. Bimetal elements of this nature are quite common in the field and are generally made out of a stiff metal "sandwich" having one side made of a metal having a high coefficient of thermal expansion. Bimetal elements 34 are bent so that the side having the metal with the high coefficient of thermal expansion is on the inside of the U and the metal with the low coefficient of thermal expansion is on the outside of the U. With the application of heat to the bimetal elements 34, pressure is exerted through pins 35 to pulley 26 and, conversely, when heat is reduced, the pressure is relaxed. Because bimetals 34 are clamped tightly in place at their centers by lock nut 32, any temperature differential which ordinarily causes expansion and/or contraction causes the free ends of the strips to flex outward or inward to engage and move the pins 35 thereby exerting or relaxing pressure on pulley 26. Typically, with no limitation being intended, the bimetal elements may be approximately an inch wide and three inches long and may be a commercially available type such as Chace 6650. The pins 35 are preferably constructed from material having a low coefficient of expansion and a limited degree of compressibility, for example, aluminum. These pins project toward the pulley 26 and are free to move through openings in the hub portion of fan 30 to press against an annular flange formed at the end of a tubular bearing member 36. In order to reduce wear of the flange on bearing member 36, an axially free and revolubly driven thrust washer may be inserted between the pins 35 and the bearing flange. The thrust washer would then rotate at the same speed as the pins so the wear would be between the thrust washer and the bearing flange. Typically, this bearing member may be of the porous, permanently lubricated type, for example, that which is commonly known by the tradename "Oilite."

The fan 30, bimetal element 34 and various component parts associated therewith, are enclosed in an approximate semispherically shaped rigid casing or shroud 38. A bearing support member 39 containing a self-lubricating bearing 40 is mounted in the shroud 38 to receive shaft extension 23 which is then free to rotate when the shroud is held in place. To prevent the bearing support member 39, bearing 40 and shroud 38 from slipping off the end of the shaft extension 23, a moveable pin 41 may be extended through an opening in the bearing support member 39 and bearing 40 to rest in an annular recess 42 formed around shaft extension 23. The pin 41 may be held within the recess 42 by a spring 43. The pin 41, of course, is made out of a material which will not bind against the shaft extension nor wear to any substantial degree over a long period of time. To aid in this assembly, the pin 41 may be accessible through an opening or intake port 44 in the shroud 38. Intake port 44, more importantly, provides an opening through which a sample of air from the circulating system may be passed to operate the bimetal elements 34. The opening 44 is defined by a short cylindrical extension 45 of shroud 38.

A conduit 46 is attached at one end of the cylinder extension 45 of the shroud 38 and its other end is located somewhere in the air circulation system, such as in plenum chamber 11. In most installations it is necessary to extend the conduit 46 through an opening in the wall of the blower cabinet 15. Fan 30 serves to draw the sample of air through the conduit 46 into the shroud through the opening 44 and the air is discharged around the outer edge 38a of the shroud between it and the periphery of the fan 30.

Figure 6:
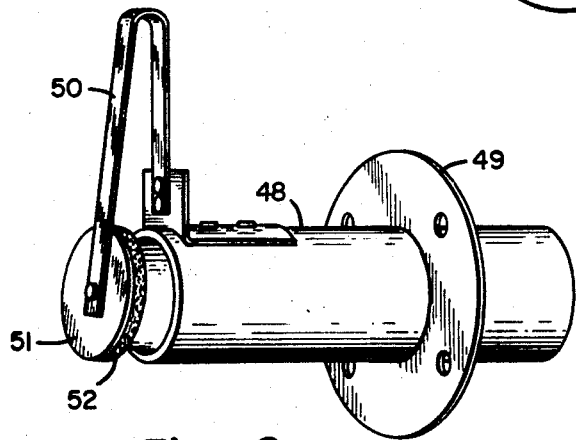
FIG. 6 is a somewhat enlarged view of the intake end of a sample air conduit showing the means for automatically closing off the intake end of the conduit.

Referring now principally to FIG. 6, at its input end tubing 46 has a short length of piping 48 which may be attached to the side of plenum chamber 11 by sheet metal screws passing through a supporting flange 49 and threaded into the wall of the chamber. An inverted U-shaped temperature responsive bimetal member 50 is mounted near the input end of piping 48. One arm of member 50 is rigidly attached to the piping 48 in any convenient fashion, for example, by screws or by welding or the like. Attached to the free arm of member 50 is a circular clapper or closure member 51 having a padding 52 on its inner face. The member 50 is selected and mounted so that when the plenum chamber 11 contains warm air, the closure 51 is positioned away from the end of the pipe 48 so that the air can be drawn into the conduit 46 and shroud 38 by fan 30. When the temperature of the air in the plenum chamber lowers, the arm starts to close toward the open end of the pipe 48 and upon reaching a certain preset temperature, the end of the piping is closed off completely by closure 51. Ordinarily, the temperature at which closure 51 closes off the end of pipe 48 is selected so that the sampling tube is closed off during cooling, ventilating, or filtering modes of operation and is open during the normal heating mode of operation.

Referring back again to FIGS. 2 and 3, a flat annular electrical heating element 54 is mounted within shroud 38 in close proximity to the bimetal elements 34 so that the latter can respond quickly to small amounts of heat generated by heating element 54. Preferably the heating element is an electrical resistance capable of generating in the order of 30 to 35 watts at 24 volts, although no limitation thereto is intended. The heating element 54 may be of a type which employs electrical resistant (heat producing) wires embedded between two layers of reinforced flexible silicone rubber sheeting. The electrical heating wires are attached to two leads or wires 56 which are provided to make a convenient electrical connection of the heater 54 to a suitable energy source such as shown in the circuit diagrams in FIGS. 4 and 5. The heating element 54 may be mounted by adhesive or other means onto a rigid mounting plate 55. Heater mounting plate 55 with heater 54 attached is located in close proximity to bimetals 34 and is attached to the shell of shroud 38 at tabs. Wires 56 pass from heater 54 through a small hole in shroud 38 and provide a convenient means of making an electrical connection outside shroud 38. The annular openings between the heater and heater mounting plate and the shroud and the shroud bearing support, allows the sample of warm air from the plenum chamber to pass around the heater mounting plate and through the shroud and affect the bimetal elements during the heating mode of operation.

The friction disc 28 may be constructed from a suitable wear resistant material such as cork or brake lining material and the fixed clutch plate 22 preferably contains heat dissipating blades 22a. In the event it is desired that the pulley 26 should always be driven at the same speed as the motor shaft 20, there is provided in the hub portion of the clutchplate 22 a hole 57 which may be aligned with a recess 58 in the pulley 26 to receive a locking pin or set screw (not shown) for rendering the clutch inoperative. Other somewhat more accessible means may be provided to lock the clutch and pulley to the clutchplate. In the past, when the mode of operation was changed from heating to cooling, ventilating, or filtering, this manual locking had to be done because there were no means available by which the bimetal elements 34 could be actuated to operate the friction clutch.

In conventional forced air systems, the blower motor operates under control of a thermostatic switch located in the plenum chamber or elsewhere in the circulating air stream whereby the blower is turned on and off when the air temperature at the control element reaches a predetermined figure, usually somewhere between 80 and 100° F. The present invention is designed for use with a forced air heating system of this nature which has the usual burner controls for starting and stopping the burner in the furnace in response to the varying demands for heat, as controlled by a thermostat usually located in the area being heated. According to the teachings of this invention, the same system can be operated in other air conditioning modes of operation such as cooling or merely circulating the air to keep it filtered and fresh. During the latter modes of operation the blower can be run at constant speed or varied if desired.

Figure 4:
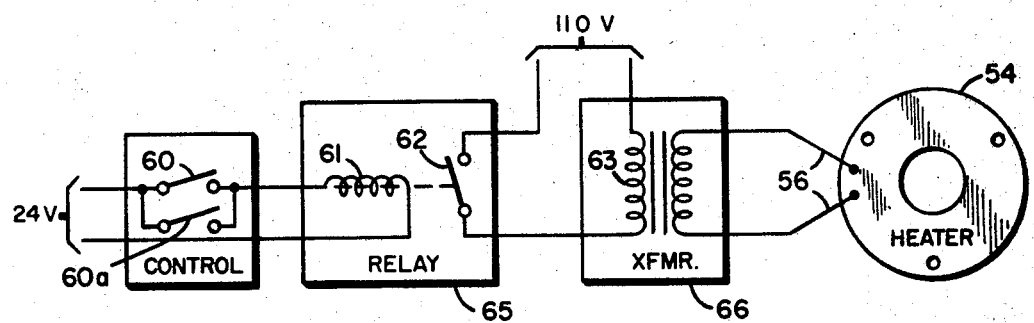
FIG. 4 is a partially schematic wiring diagram showing the electric circuit for a preferred embodiment of the invention.

Turning now to FIG. 4, there is shown an electrical circuit diagram for a typical electrical hookup of the present invention. In the conventional system, a thermostat control is at some remote location, generally in one of the rooms being heated or cooled by the system. The thermostat control ordinarily contains a set of contacts 60 which close upon a rise in room temperature when the system is in the cooling mode of operation. In the case of a combination "heating-cooling" thermostat located within the space to be heated or cooled, a manually operated switch 60a, usually labeled "fan-on," may be closed for operating the system in the ventilating or filtering modes. Closing either the automatic or thermostatically-actuated contact 60 or the manually operated contact 60a, will complete the circuit to apply a low voltage, in the order of 24 v., to relay coil 61. This closes relay contact 62 to apply the household AC voltage of 110 volts to the primary of a transformer 63. The 110 volts is then stepped down to 25 volts by the transformer secondary which is electrically connected to the heater element 54 by conductors 56. The isolating relay 65 and a separate transformer 66 in the circuit because the current requirements of heater 54 may exceed the capacities of certain other parts (not shown) which are coupled electrically to the circuits operated by contact 60. It should be understood that the various component parts are ordinarily suitably mounted and connected together to comply with various safety codes that may be in effect for any given location and that the voltages used in describing this circuit diagram are only exemplary and not intended to be limitative.

OPERATION

*Heating mode.*—With the variable speed blower drive mechanism connected to the shaft of drive motor 19 as previously described, fan 30 and the temperature responsive bimetal elements 34 are rotated at the speed of the drive motor 19 whenever the latter is in operation. Assuming the temperature of the air in the plenum chamber 11 is high enough so that closure 51 is open, air from the plenum chamber will be drawn by fan 30 through conduit 46 and opening 44 is shroud 38 and applied to the bimetal elements 34. The latter are designed and arranged in relation to the clutch and pulley on the motor shaft 20 to exert little or no pressure through the pins 35 initially when the temperature of the air sample being drawn in from the plenum is below a pre-set level. Under those conditions, even though the drive motor 19 is operating at full speed, blower 14 remains stationary or revolves very slowly. When the temperature of the air sample increases, it causes the free arms of the bimetal elements 34 to flex toward pins 35 which, in turn, applies pressure through pins 35 onto pulley 26 to increase the degree of friction between it and friction disc 28 and clutchplate 22. The pulley 26 then starts to rotate and through the coupling by belt 27 to blower pulley 18 causes blower 14 to rotate to start pulling air through the circulating system. As the temperature of the circulating air increases, the pressure applied to pulley 26 by the bimetal elements 34 correspondingly increases with a resulting increase in the blower speed. This can be increased until the blower is driven at its top speed. When the thermostat control turns off the burner so the temperature of the circulating air drops, a corresponding change is reflected in the positioning of the arms of bimetal elements 34 which relaxes pressure exerted on pins 35, pulley 26, etc. and results in increased slippage between the clutch plate and the pulley with a corresponding reduction in the speed of the blower. In this manner, the blower speed is varied proportionately to the temperature of the circulated air to make for more efficient and uniform heating of the area.

*Cooling mode.*—For the same system to operate in the cooling mode, a separate "cooling" thermostat may be located within the space to be cooled. The contacts 60 of this cooling thermostat close upon a rise in the air temperature of the space to be cooled. This will start an air conditioning compressor (not shown) which in turn cools the coil 9 (FIG. 1) and at the same time applies voltage to the primary 61 of relay 65 closing contacts 62. Line voltage is thereby applied to the primary 63 of transformer 66 applying energy to heater 54. As described earlier, application of energy to heater 54 causes bimetal elements 34 to warm up which in turn increases the frictional engagement between clutch 28 and clutchplate 22 driving pulley 26 at an increased speed. This results in blower 14 operating at an increased speed to distribute cooled air throughout the system. Ordinarily the heater 54 generates enough heat so that blower 14 is driven at maximum speed. As the air in plenum 11 is cooled, closure 51 actuates by temperature responsive bimetal element 50 closes off pipe 48. No cool air is then allowed down conduit 46 to reach bimetal elements 34. Heating element 54 is therefore made more effective because its heat is not overcome by cool air being drawn in from plenum 11.

When contacts 60 within the room "cooling" thermostat open because of a drop in room temperature, the air-conditioner compressor is turned off and heater 54 is de-energized so that bimetal elements 34 relax the pressure on pulley 26 allowing an increased slippage between clutch 28 and clutchplate 22 and blower 14 is thereby driven at a slower speed. By driving blower 14 at or near maximum speed when contact 60 is closed, the need for mechanically locking pulley 26 to clutchplate 22 has been eliminated.

*Ventilating or filtering mode.*—It is sometimes desirable to circulate a large volume of air throughout the system in order to ventilate and/or filter the air in the system without either heating or cooling. In that case, switch contact 60a (FIGS. 4 and 5) is closed. A combination "heating-cooling" thermostat will ordinarily have a manually operable switch usually identified as "fan-on." Contact 60a energizes the circuits shown in FIGS. 4 and 5 in the same manner as described earlier so that the blower 14 is rotated and usually at maximum speed. During operation in the ventilating or filtering mode closure 51 closes off pipe 48 to prevent plenum air from reaching the shroud. Bimetal element 50 is desirably set so that closure 51 remains closed unless the temperature in the plenum is in the order of 80–85° F. It can be seen that by use of this invention during the cooling or the ventilating-filtering modes of operation the blower in the system can be driven at or near its maximum speed without the necessity of mechanically locking pulley 26 to clutchplate 22. In fact, a system employing a room thermostat for the heating mode and a separate room thermostat for the cooling mode of operation can go from one mode to the other upon demand of the respective thermostats with no manual manipulations whatever.

Figure 5:
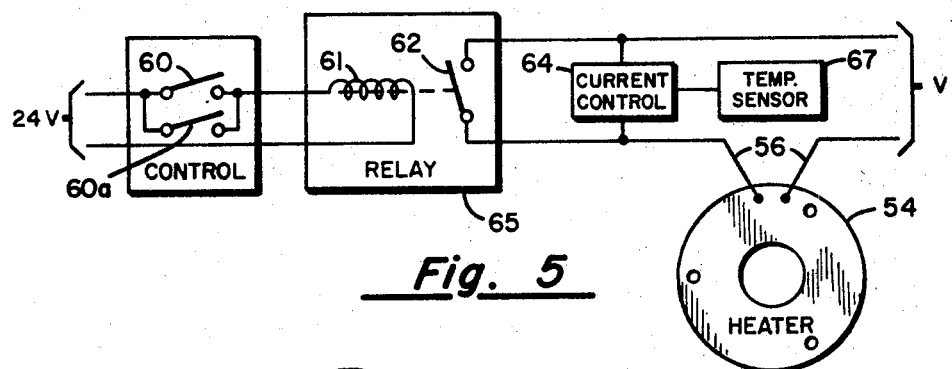
FIG. 5 is an electrical schematic digram illustrating a variation of the electrical control circiut used in conjunction with another embodiment of the invention.

FIG. 5 shows in somewhat schematic form a variation of the invention. The heater element 54 may be connected in circuit in the same manner as previously described to some suitable voltage source, designed V. During the heating mode of operation, relay contacts 62 remain open and energy from source V is fed to the heating element through a current controlling device 64, which may be located in any convenient place. Instead of an air sampling tube carrying a sample of warm air to the bimetal elements 34, a temperature sensing device 67, such as a thermistor, may be located in the plenum chamber 11 or at some other convenient spot to reflect the temperature of the circulating air and to control the amount of current being fed through current control 64 to heater element 54. In this manner an automatically varied amount of heat may be generated by the heater element 54 and applied to the bimetal elements 34 to smoothly vary the speed at which the blower 14 is driven, in the same manner as described previously. During the cooling mode of operation switch 60 is closed and during the ventilating-filtering mode switch 60a is closed either of which, in turn, causes the circuit to operate in the same manner as described above. It is contemplated that even during the cooling mode of operation, a temperature sensitive device can be conveniently located and connected into the circuit in a manner similar to temperature sensor 67 to vary the amount of energizing current being fed to heating element 54 and thereby vary to speed of rotation of the blower for more efficient and uniform cooling. It is also contemplated that for other air conditioning modes of operation, for example, for air freshening or ventilating, a device which senses the amount of air contamination can be used in conjunction with the control mechanisms and circuits described heretofore to similarly control the energizing current to the heater element 54 and correspondingly control the operation and speed of the blower. In any event, it can be seen that there has now been developed means whereby the operation of a forced air circulating system is conveniently, quickly and easily put into use when changing between the various possible modes of air conditioning operations such as heating, air cooling, air filtering, ventilating and the like.

We claim:

1. In a forced air heating and air-conditioning system having a blower, a constant speed drive motor, a motor driven pulley and a pulley-belt assembly for coupling the motor-driven pulley to the blower, the improvement comprising the combination of:

(a) a friction clutch located between the drive motor shaft and the driven pulley;

(b) a temperature responsive member mechanically coupled to said clutch for controlling the degree of frictional engagement of the clutch to thereby control the speed at which the motor drives said driven pulley;

(c) a fixedly located shroud enclosing said temperature responsive member;

(d) an electrically energized heating element attached to said shroud located in close proximity to said temperature responsive member for applying heat to operate said member;

(e) means electrically connected to said heating element for adjustably controlling the heat output of said element;

(f) an air sampling tube attached to said shroud for carrying a sample of air from the heating and air conditioning system to said temperature responsive member; and (g) selectively actuable valve means for closing off said tube to prevent the air from the system from passing through said tube.

2. The invention as in claim 1 wherein said valve means is a temperature responsive valve means for closing off said tube when the temperature within the system falls below a predetermined level.

3. The invention as in claim 2 wherein said temperature responsive valve means is located within the system air flow path and comprises a bimetal arm having a plate closure member at one end, said arm arranged to move in a direction to position the closure member over the open end of the tube as the system air temperature decreases.

References Cited

UNITED STATES PATENTS

| 2,308,507 | 1/1943 | Hallinan | 236—10 |
| 2,509,948 | 5/1950 | White | 236—10 |
| 2,838,243 | 6/1958 | Peters | 236—10 |

EDWARD J. MICHAEL, Primary Examiner

U.S. Cl. X.R.

236—68, 73